United States Patent [19]
Prior et al.

[11] 3,891,552
[45] June 24, 1975

[54] CONTROL VALVE FOR WATER SOFTENERS

[76] Inventors: William C. Prior, 9482 Fairmount Blvd., Novelty, Ohio 44072; James W. Kewley, 13681 Auburn Rd., Newbury, Ohio 44065

[22] Filed: Apr. 12, 1974

[21] Appl. No.: 460,292

[52] U.S. Cl. .................. 210/88; 210/98; 210/190; 210/264
[51] Int. Cl. ............................................ B01d 15/04
[58] Field of Search .......... 210/87, 88, 94, 98, 103, 210/105, 139, 140, 190, 264

[56] References Cited
UNITED STATES PATENTS

| | | |
|---|---|---|
| 1,990,722 | 2/1935 | Bashioum .......................... 210/98 |
| 2,024,479 | 12/1935 | Short .................................. 210/87 X |
| 3,396,845 | 8/1968 | Bouskill ............................. 210/98 |
| 3,509,998 | 5/1970 | Pellett et al. ..................... 210/98 |
| 3,638,794 | 2/1972 | Holzed .............................. 210/98 |

Primary Examiner—John Adee

[57] ABSTRACT

A water softener control valve operates to automatically connect one of two water softener tanks on-line with a water supply system while taking the other tank off-line and cycling it through a regeneration. A water usage turbine monitors the use of softened water. Rotation of the water usage turbine through a predetermined number of revolutions effects an initial movement of a control wheel. The initial control wheel movement causes a control valve to open supplying a controlled flow of softened water to a regeneration turbine. Rotation of the regeneration turbine drives the control wheel continuing its movement. A pilot system and servo-valves responsive to the continued control wheel movement connect one of the softener tanks on-line and take the other tank off-line and cycle it through a regeneration.

21 Claims, 10 Drawing Figures

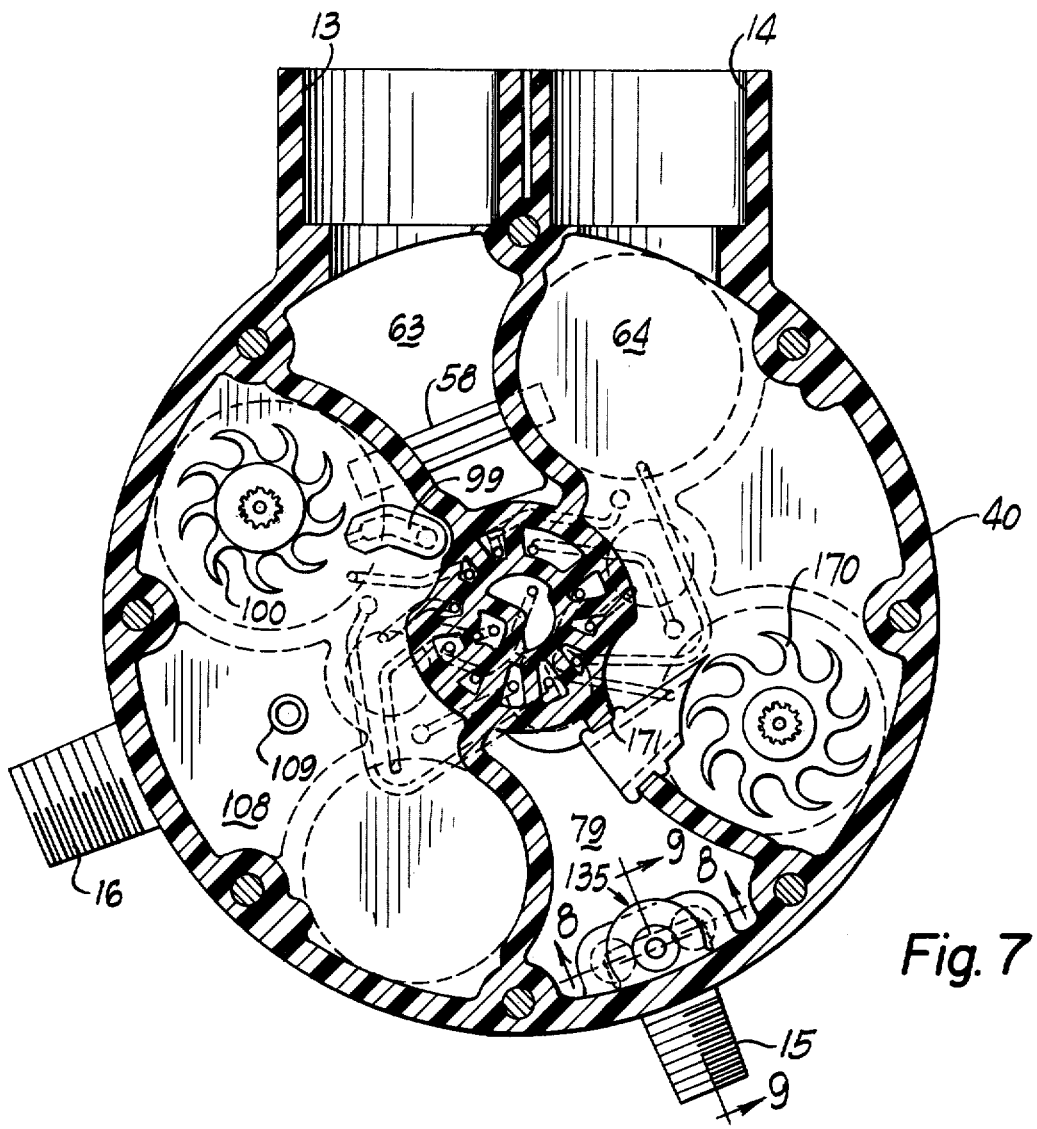
Fig. 7
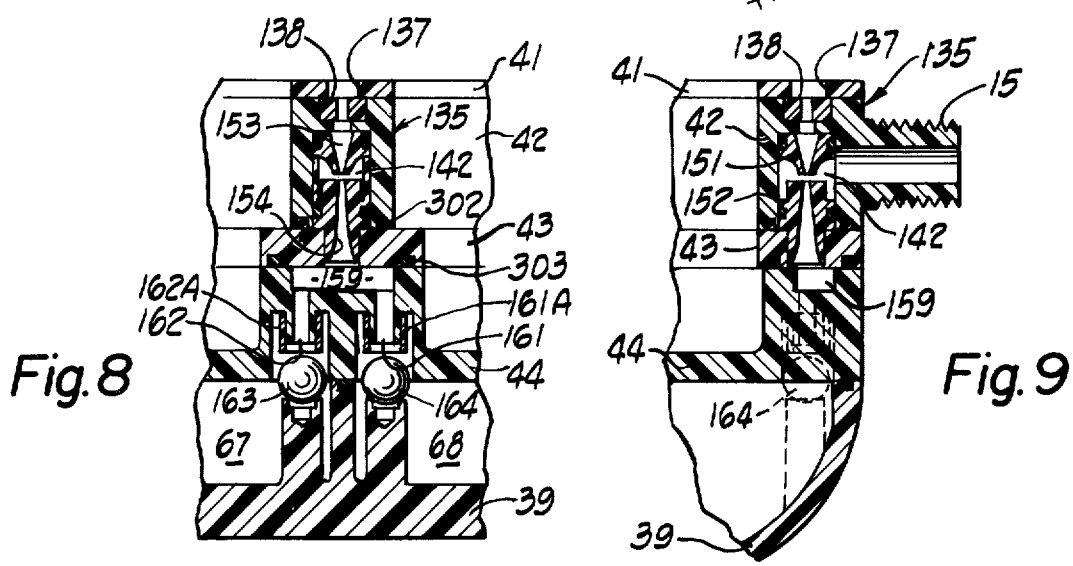
Fig. 8
Fig. 9

| FUNCTION | CONTROL VALV. 75 | TANK #1 VALVES | | | TANK #2 VALVES | | |
|---|---|---|---|---|---|---|---|
| | | INLET VALV. 71 | OUTLET VALV. 76 | DRAIN VALV. 73 | INLET VALV. 72 | OUTLET VALV. 77 | DRAIN VALV. 74 |
| 1 TANK #1 ON LINE IN SERVICE TANK #2 OFF LINE READY FOR SERVICE | X | O | O | X | X | O | X |
| 2 REGENERATION INITIATED | O̲ | O | O | X | X | O | X |
| 3 TANK #2 PUT INTO PARALLEL SERVICE WITH TANK #1 | O | O | O | X | O̲ | O | X |
| 4 TANK #1 TAKEN OUT OF SERVICE | O | X̲ | O | X | O | O | X |
| 5 BACK PRESSURE TO TANK #1 THROUGH THE FIRST OUTLET VALVE IS CUT OFF | O | X | X̲ | X | O | O | X |
| 6 REGENERATION OF TANK #1 IS BEGUN BRINE IS ASPIRATED UNTIL EXHAUSTED WHEREAFTER SLOW RINSE CONTINUES WITH SOFTENED WATER | O | X | X | O̲ | O | O | X |
| 7 FAST BACKWASH RINSE WITH SOFT WATER IS STARTED | O | X | O̲ | O | O | O | X |
| 8 REGENERATED TANK #1 IS PUT ON HOLD | O | X | O | X̲ | O | O | X |
| 9 FLOW TO REGENERATION TURBINE IS STOPPED TO TERMINATE REGENERATION CYCLE | X̲ | X | O | X | O | O | X |
| 1A AND TANK #2 ON LINE IN SERVICE TANK #1 OFF LINE READY FOR SERVICE | X | X | O | X | O | O | X |
| 2A REGENERATION INITIATED | O̲ | X | O | X | O | O | X |
| 3A TANK #1 PUT INTO PARALLEL SERVICE WITH TANK #2 | O | O̲ | O | X | O | O | X |
| 4A TANK #2 TAKEN OUT OF SERVICE | O | O | O | X | X̲ | O | X |
| 5A BACK PRESSURE TO TANK #2 THROUGH THE SECOND OUTLET VALVE IS CUT OFF | O | O | O | X | X | X̲ | X |
| 6A REGENERATION OF TANK #2 IS BEGUN BRINE IS ASPIRATED UNTIL EXHAUSTED WHEREAFTER SLOW RINSE CONTINUES WITH SOFTENED WATER | O | O | O | X | X | X | O̲ |
| 7A FAST BACKWASH RINSE WITH SOFT WATER IS STARTED | O | O | O | X | X | O̲ | O |
| 8A REGENERATED TANK #2 IS PUT ON HOLD | O | O | O | X | X | O | X̲ |
| 9A FLOW TO REGENERATION TURBINE IS STOPPED TO TERMINATE REGENERATION CYCLE | X̲ | O | O | X | X | O | X |

Fig. 10

CONTROL VALVE FOR WATER SOFTENERS

BACKGROUND OF THE INVENTION

1. Field of the Invention

The present invention relates to water softeners, and more particularly to a control valve for alternately connecting one of two softener tanks on-line with a household water supply and automatically cycling the off-line tank through a regeneration cycle.

2. Prior Art

Household water softeners of the "ion exchange" type typically include a resin tank through which hard water passes to exchange its "hard" ions of calcium and magnesium for "soft" sodium ions from the resin bed. Regeneration of the resin bed is required periodically to remove the accumulation of hard ions and replenish the supply of soft ions. Regeneration is effected by flushing a solution of salt, i.e., a brine solution, through the resin bed.

The regeneration cycle typically lasts about an hour and needs to be done, on the average, about three or four times each week. More frequent regenerations are required in periods of greater than normal water usage. No regeneration is required when water usage ceases as typically happens when the occupants of the household go on a holiday.

Most present day water softeners use a single resin tank for softening and are provided with automatic controls to regenerate the softening tank at periodic intervals. Such apparatus have a number of disadvantages including:

1. When the resin tank is being regenerated, the supply of soft water to the household is discontinued and the hard water source is coupled directly on-line with the household water system.

2. Regeneration of the resin tank is effected with hard water. This is significantly less efficient than regenerating with soft water and consumes more salt. Water softened by resin which has been regenerated with hard water and with brine solution made from hard water is harder than it would be if soft water were used in regenerating the resin bed.

3. Regenerating with hard water permits hard water deposits to form and collect in the brine aspirator, and this problem is a frequent source of service calls.

4. Counterflow brining techniques which are preferred because they effect a good, thorough regeneration of the resin bed are difficult to effect when hard water is used in regeneration. Counterflow brining requires accurate control of the brine flow rate to prevent expansion and floating of the resin bed. Such flow controls as are needed to monitor the brine flow rate tend to become clogged and malfunction with continued exposure to hard water.

Most present day water softeners utilize electrically powered controls, typically including timers, water hardness sensors, solenoids and the like. The use of electrically powered controls complicates installation and servicing of the softener. A number of manufacturers have reported that the majority of their service calls involve a breakdown in the electrical controls, typically the timer.

Sensor controlled water softeners have the disadvantage that they can start a regeneration cycle at inconvenient times when substantial water usage is in progress. Timer-controlled models obviate this problem by scheduling regenerations late at night or at other times when water usage is not anticipated. Timer-controlled softeners present problems in that they may effect too few regenerations in periods of unexpectedly high water usage, and may effect unnecessary regenerations in periods of low water usage.

Still another problem with most present day water softeners is that they provide a host of controls with adjustments for regeneration frequency, regeneration cycle length, salt dosage, and the like. These adjustments must be coordinated with changes in living patterns in the home in order to efficiently provide a continuous supply of soft water. The adjustments are complex and obtaining the optimum settings often requires some experimentation.

A number of proposals have been made in the prior art to obviate some of these difficulties. Water softeners employing two softening tanks which are alternately placed on-line have been proposed. Two-tank softeners have the advantage that the soft-water supply need never be interrupted. The off-line tank can be regenerated while the on-line tank is in service, and regeneration can take place efficiently using soft water from the on-line tank.

The use of a water-meter to monitor soft water usage and initiate regeneration cycles when needed has also been proposed. Various types of programmed pilot systems including servo-valves are known and some proposals have been made to use various types of valves in water softener control systems. However, no commercially successful water softener has resulted incorporating these combined proposals.

SUMMARY OF THE INVENTION

The present invention overcomes the foregoing and other drawbacks of the prior art by providing a valve assembly including a system of servo-valves which open and close automatically under the direction of a hydraulically driven pilot control to switch one of two softener tanks on-line when the other tank has been exhausted, and to regenerate the off-line tank.

The valve assembly requires no electrical hookup and employs no electrical sensors or timers. Soft water usage is monitored to determine when the on-line tank is exhausted. Soft filtered water from the on-line softener tank is used to sequence the valve through regeneration of the off-line tank. Regeneration of the off-line tank is effected efficiently with soft water, and no hard water is admitted to the brine aspirator.

There are no controls to be adjusted by the operator. An indicator wheel having a configuration selected in accordance with the hardness of the water to be treated is installed when the softener is hooked up. No other adjustments for cycle length or regeneration frequency and the like are required.

The valve assembly includes seven servo-valves. Three of the servo-valves are associated with one of the softener tanks, and three with the other tank. These six valves are called the first and second inlet valves, the first and second outlet valves, and the first and second drain valves. The seventh servo-valve is called the control valve.

The first and second inlet valves admit untreated water to the first and second softener tanks, respectively. The first and second outlet valves permit treated water to discharge from the first and second softener tanks. The first and second drain valves permit spent regenerant fluid (backwash fluid) to leave the first and second softener tanks and be ported to a drain. The control valve provides a controlled flow of water to a regeneration turbine which drives the pilot control system through a regeneration cycle.

The use of softened water is monitored by a water usage turbine. As treated water passes toward the outlet of the valve assembly, it turns the water usage turbine. The water usage turbine drives an indicator wheel which is visible through a window in the top of the valve housing. The indicator wheel carries a plurality of toothed segments which are operative to initiate the process of switching a serviced tank on-line, switching the exhausted tank off-line, and regenerating the exhausted tank.

The number of toothed segments carried on the indicator wheel determines how much soft water will be used before a regeneration cycle is initiated. An indicator wheel having the proper number of toothed segments is selected at the time the water softener is installed. Where excessively hard water is to be treated, regeneration frequency is increased by selecting an indicator wheel having a relatively large number of toothed segments, typically 5 or 6. Where relatively soft water is being treated, regeneration frequency is reduced by selecting an indicator wheel having a relatively small number of toothed segments, typically 2 or 3.

The pilot control system which sequences the seven servo-valves through a program of operation includes a stationary control disc and a rotatable control wheel. A substantial number of ports open through the control disc toward the rotatable wheel. These ports communicate with the seven control chambers of the servo-valves. The control wheel engages the control disc and has a depending wall which passes over the ports as the wheel rotates to sequentially communicate the ports with a source ore pressurized softened water and with an ambient pressure drain. This sequential pressurization and de-pressurization of the ports establishes pressure differentials that sequentially open and close the seven servo-valves.

In operation, normal on-line service occurs when one of the softener tanks is on-line receiving untreated water and supplying softened water, while the off-line tank is regenerated and standing by ready for service. When the water usage turbine has turned the indicator wheel to a position where one of its toothed segments is operative to drive the rotatable control wheel of the pilot system, a regeneration cycle is begun.

The regeneration cycle includes several steps. First, the regenerated off-line tank is put on-line in parallel with the exhausted on-line tank. The exhausted tank is then taken off-line and backwashed slowly with softened water and a brine solution. A higher velocity softwater rinse is subsequently backwashed through the off-line tank to complete its regeneration. The regenerated tank is then held off-line until the water usage turbine has rotated a predetermined number of revolutions indicating that the on-line tank has been exhausted.

The novel structural arrangement of valve components which effect this operation includes a valve housing having a base member, a top member, and a stacked array of four cylindrical disc members interposed between the base and top members. The water usage turbine and the regeneration drive turbines are housed within the top member, together with the operating elements of the pilot control system. The seven control chambers for the servo-valves are defined by the second and third disc members. The seven openings against which the servo-valves seat are defined by the third and fourth disc members. This compact and orderly arrangement of the valve components simplifies manufacture, minimizes valve cost, and facilitates servicing and parts replacement.

As will be apparent from the foregoing summary, it is a general object of the present invention to provide a novel and improved water softener control valve.

Other objects and a fuller understanding of the invention may be had by referring to the following description and claims taken in conjunction with the accompanying drawings.

BRIEF DESCRIPTION OF THE DRAWINGS

FIG. 7 is a cross-sectional view as seen from the plane indicated by the line 7—7 in FIG. 6;

FIGS. 8 and 9 are cross-sectional views as seen from planes indicated by the lines 8—8 and 9—9 in FIG. 7; and, FIG. 10 is a chart which shows the sequence of operation of the servo-valves which form a part of the control valve of the present invention.

DESCRIPTION OF THE PREFERRED EMBODIMENT

Figures 1, 2:
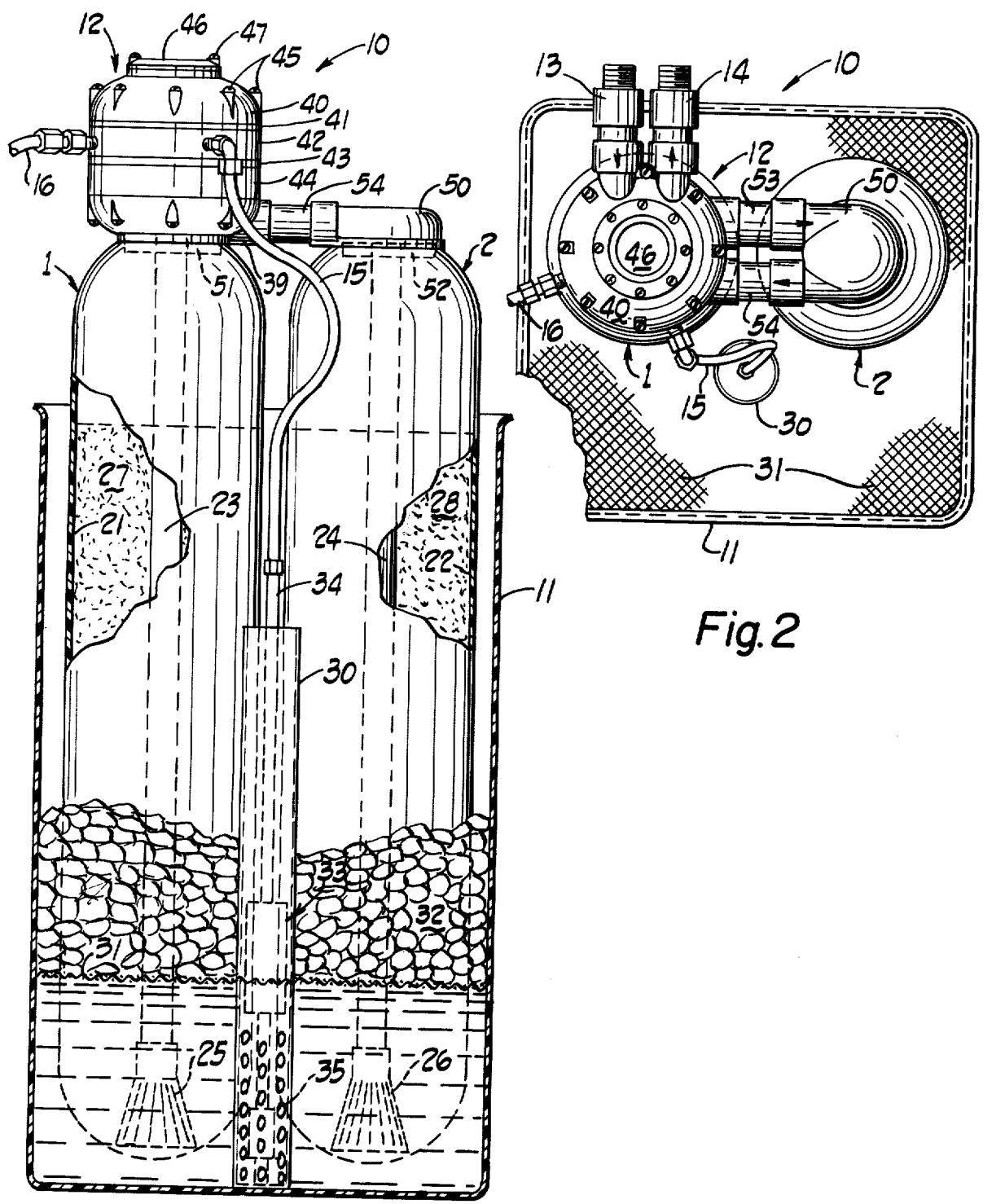
FIG. 1 is a cross-sectional view of a water softener employing the control valve of the present invention, with portions of the softener tanks being broken away.
FIG. 2 is a top plan view of the water softener on the same scale as FIG. 1, with portions of the softener being broken away.

Referring to FIG. 1, a water softener 10 includes a pair of softener tanks 1, 2 positioned upright in an open-top brine tank 11. A valve assembly 12 is supported atop the tanks, 1, 2. The valve assembly 12 is programmed, as will be explained, to selectively maintain one of the tanks 1, 2 on-line with a household water supply system. The off-line tank is subjected to a regeneration cycle and then held off-line until the on-line tank is exhausted. The frequency with which the valve assembly 12 switches the tanks 1, 2 from on-line operation to regeneration is controlled by monitoring the usage of softened water.

Four conduits communicate with the valve assembly 12. Hard water is delivered to the valve assembly 12 through an inlet conduit 13. Softened water is discharged from the valve assembly 12 through an outlet conduit 14. Brine from the brine tank 11 is admitted to the valve assembly 12 through a brine conduit 15. Waste water from the regeneration cycle is discharged from the valve assembly through a drain conduit 16.

The softener tanks 1, 2 are of known configuration and utilize common water softening chemicals. The tanks 1, 2 typically include cylinders 21, 22 of glass fiber construction which are about 6 inches in diameter and 36 inches in length. The upper ends of the cylinders 21, 22 are threaded with female 2 ½ inch NPT threads for connection to the valve assembly 12. Riser pipes 23, 24 depend centrally through the cylinders 21, 22. A pair of screens 25, 26 communicate with the lower ends of the riser pipes, 23, 24. Suitable ion-exchange softening chemicals, indicated by the numerals 27, 28, are positioned in the cylinders 21, 22 surrounding the riser pipes 23, 24 and the screens 25, 26.

The water softening process takes place as water passes through the tanks 1, 2. Hard water is channeled into the cylinders 21, 22 and is softened during its passage downwardly through the chemicals 27, 28. Softened water enters the riser pipes 23, 24 through the screens 25, 26 and is directed back out of the cylinders 21, 22.

The brine supply system is of known configuration and utilizes common ion replacement salts to regenerate the softening chemicals 27, 28. The brine tank 11 is a four-sided, upstanding, open-top container formed from suitable metal or plastic. An upstanding brine well 30 is positioned centrally in the brine tank 11. The brine well is an open-top tubular member formed from suitable metal or plastic. The lower region of the brine well 30 is apertured to admit brine.

A screen 31 extends horizontally from wall-to-wall in the brine tank 11 in regions around the softener tanks 1, 2 and around the brine well 30. The screen 31 is positioned about one-fourth of the way up the walls of the brine tank 11. Granular salt material 32 is deposited in the brine tank 11 and rests atop the screen 31.

A brine control valve 33 of known configuration is positioned in the brine well 30. One such brine control valve is described in U.S. Pat. No. 3,136,331 issued June 9, 1964 to Mathew Oleskow entitled CONTROL VALVE FOR WATER SOFTENERS. The valve 33 includes a pipe 34 which is connected at its upper end to the brine conduit 15. The lower end of the pipe 34 communicates with a valve assembly 35 which serves the dual functions of admitting a regulated amount of brine solution from the brine well 30 to the pipe 34 when the water softener establishes a suction in the brine conduit 15, and of admitting a regulated amount of softened water to the brine well 30 from the pipe 34 when the brine conduit 15 is connected to a source of pressurized softened water.

The valve assembly 12 includes a stacked array of four disc-like members 41, 42, 43, 44 interposed between a base member 39 and a top member 40. Threaded fasteners 45 extend through aligned holes in the top and disc members 40–44 and are received in threaded holes formed in the base member 39 to clamp the members 39–44 together. A cover assembly 46 overlies portions of the top member 40 and is held in place by threaded fasteners 47.

A tank connector 50 is provided to the right of the base member 39 as viewed in FIGS. 1 and 2. Threaded depending necks 51, 52 are formed on the base member 39 and on the tank connector 50 for connection with the softener tanks 1, 2. A pair of conduits 53, 54 establish communication between the base member 39 and the tank connector 50. Hard water is delivered from the base member 39 through the conduit 53 and through the tank connector 50 to the softener tank 2. Softened water from tank 2 is returned through the tank connector 50 and through the conduit 54 to the base member 39.

Figure 3:
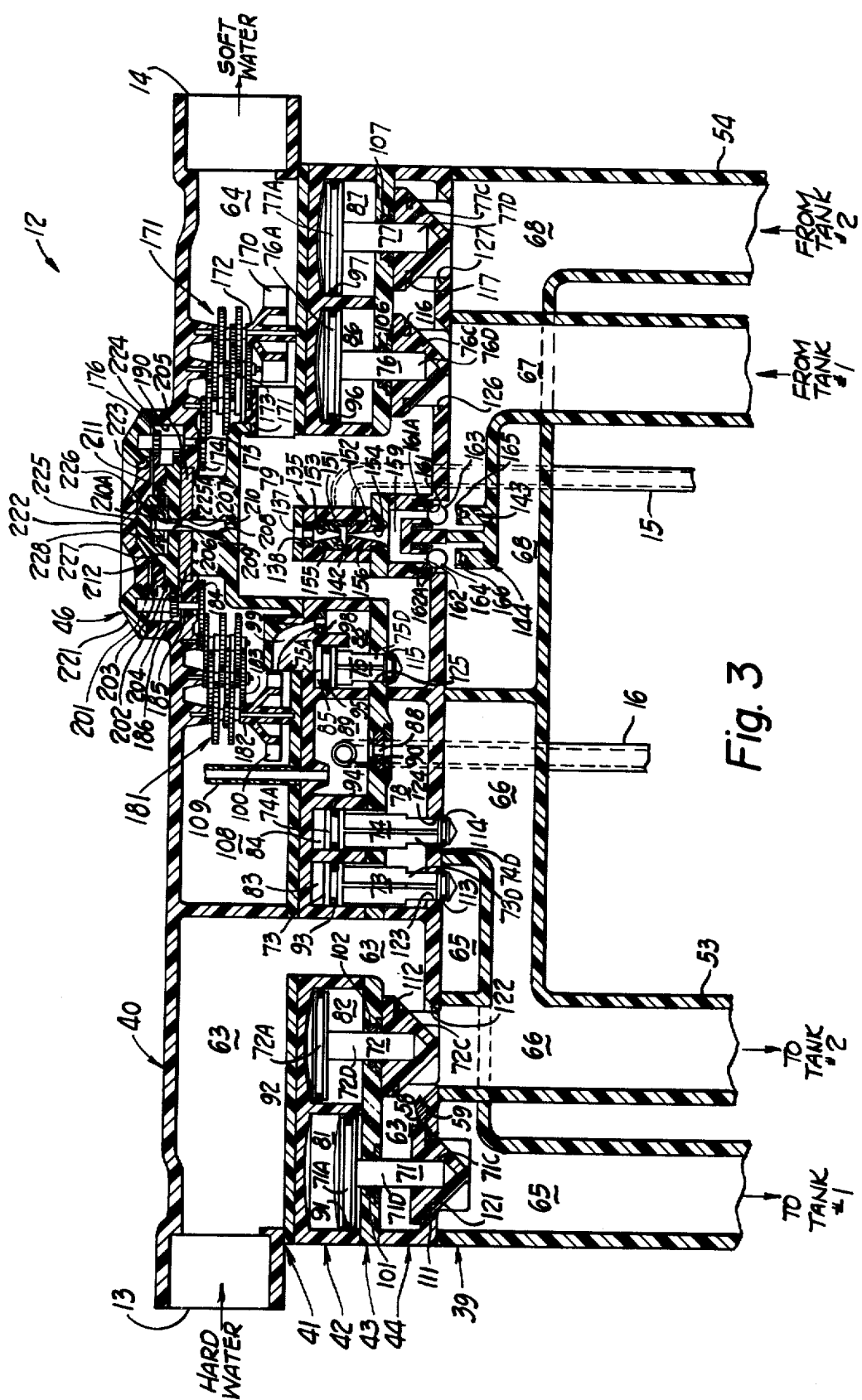
FIG. 3 is an unfolded schematic cross-sectional view of a valve constructed in accordance with the present invention.

In order to explain the structure and operation of the valve assembly 12 in an orderly and understandable manner, an unfolded schematic cross-sectional view of the valve assembly 12 is presented at FIG. 3. The schematic showing of FIG. 3 differs from the actual construction of the valve assembly 12 in that the several servo-valves and other operating components are shown as lying side-by-side in a common plane, while in the actual valve construction these components are arranged three-dimensionally within the stacked assembly of members 39–44.

Referring to FIG. 3, the inlet and outlet conduits 13, 14 are shown communicating with opposite sides of the top member 40. An inlet chamber 63 and an outlet chamber 64 are defined by portions of the members 40–44. The inlet conduit 13 admits hard water to the inlet chamber 63. The outlet conduit 14 discharges softened water from the outlet chamber 64.

Four separate chambers are defined within the base member 39. First and second supply chambers 65, 66 are defined beneath the inlet chamber 63. First and second return chambers 67, 68 are defined beneath the outlet chamber 64. The supply chambers 65, 66 communicate with the softener tanks 1, 2 respectively and supply hard water from the valve assembly 12. The return chambers 67, 68 communicate with the softener tanks 1, 2 to receive softened water.

Seven servo-valves 71–77 are movably carried within the stacked assembly of disc members 41–44. The servo-valves 71–77 have a piston-like upper end regions 71A–77A and depending central stems 71D–77D. Tapered members 71C, 72C, 76C, 77C are carried on the lower end regions of the stems 71D, 72D, 76D, 77D for movement therewith. Downwardly opening control chambers 81–87 formed in the second disc member 42 receive the upper end regions of the valves 71–77. O-ring seals 91–97 carried in peripheral grooves in the upper end regions 71A–77A establish seals between the valves 71–77 and the walls of the control chambers 81–87. The central stems of the valves 71–77 depend through apertures formed in the third disc member 43. O-rings 101, 102, 106, 107 carried by the third disc member 43 establish seals around the stems of the valves 71, 72, 76, 77. The other valves 73, 74, 75 pass freely through the third disc member.

All of the servo valves except one, namely valve 75, seat against the fourth disc member 44. Valve 75 seats against the third disc member 43. The valves 71, 72, 76, 77 carry resilient annular washers 111, 112, 116, 117 which seat against tapered annular openings 121, 122, 126, 127 formed in the fourth disc member 44. The valves 73, 74 and the valve 75 carry O-rings 113, 114 and 115 which seat around the openings 123, 124 and 125 formed through the fourth and third disc members, 44, 43, respectively.

The servo-valves 71, 72 will be referred to as the first and second inlet valves, respectively. The inlet valves 71, 72 operate to selectively establish communication between the inlet chamber 63 and the supply chambers 65, 66. In FIG. 3, the first inlet valve 71 is shown in its closed position seated against the tapered opening 121. The second inlet valve 72 is shown in its open position communicating the inlet chamber 63 and the supply chamber 66. A lever 58 is carried by the fourth disc member 44 at a location between the inlet valves 71, 72. The lever 58 has a rounded depending central projection 59 which acts as a fulcrum to pivot the lever 58 on the fourth disc member 44. Opposite ends of the lever 58 are engageable with the inlet valves 71, 72 and serve to keep one or the other of the inlet valves 71, 72 open at all times.

The servo-valves 73, 74 will be referred to as the first and second drain valves, respectively. These valves operate to selectively establish communication between the supply chambers 65, 66 and a backflow chamber 78. In FIG. 3, the drain valves 73, 74 are both shown in their closed position with the O-rings 113, 114 establishing seals around the openings 123, 124.

The servo-valve 75 will be referred to as the control valve. This valve operates to selectively establish communication between a soft water collecting chamber 79 and a passage 80. In FIG. 3, the control valve 75 is shown in its closed position with the O-ring 115 establishing a seal around the opening 125.

The servo-valves 76, 77 will be referred to as the first and second outlet valves, respectively. The outlet valves 76, 77 operate to selectively establish communication between the return chambers 67, 68 and the soft water collecting chamber 78. Both of the outlet valves 76, 77 are shown in their open position in FIG. 3.

The inlet valves 71, 72 and the outlet valves 76, 77 perform dual functions. One function of these four valves is to control which of the softener tanks 1, 2 is placed on line. When the first inlet and outlet valves 71, 76 are open, the first softener tank 1 is on-line. When the second inlet and outlet valves 72, 77 are open, the second softener tank 2 is on-line. A second function of the inlet valves 71, 72 is to prevent the entry of regeneration backwash fluid from the supply chambers 65, 66 into the inlet chamber during regeneration of the off-line tank. A second function of the outlet valves 76, 77 is to selectively supply pressurized softened water from the soft water collecting chamber 79 to the off-line tank for backflow rinse during regeneration.

The drain valves 73, 74 function during regeneration to channel backflow from the off-line tank to the backflow chamber 78. The backflow then passes through a pressure compensated flow control 88 and then into a drain chamber 89. A drain opening 90 communicates the drain chamber 89 with the drain conduit 16 to dispose of the backflow fluid.

The control valve 75 functions during regeneration to provide a flow of softened water to drive a servo-control for sequencing the off-line tank through a regeneration cycle. As will be explained in greater detail, a regeneration cycle is initiated by opening the control valve 75 to admit softened water from the soft water collecting chamber 79 to the passage 80. Soft water from the passage 80 passes through a pressure compensated flow control 98 and then into a nozzle 99. The nozzle 99 directs the flow into an overflow chamber 108.

The pressure compensated flow controls 88, 98 can be of any of a number of commercially available types. The flow controls shown in the drawings are resilient elastomeric washers which, when subjected to increased pressures, deform to further restrict their flow passages. Flow controls of this type are sold commercially under the trademark "Hendey Flo-Rator" by the Hendey Water Products Company, Beaumont, Calif. Other pressure compensated flow controls of more complex construction can be used such as those sold under the trademark "Mesur-Flo" by the Hays Manufacturing Company, a division of Zurn Industries, Inc., Erie, Pa.

A regeneration drive turbine 100 is rotatably mounted in the overflow chamber 108. The flow of softened water from the nozzle 99 impinges on the turbine 100 causing the turbine to rotate. As will be explained, the rotating turbine 100 drives a servo-control system for cycling the off-line tank through regeneration.

Water exhausted from the turbine 100 is collected in the overflow chamber 108. An overflow tube 109 ducts water from the overflow chamber 108 to the drain chamber 89 for discharge through the drain conduit 16.

An aspirator assembly, indicated generally by the numeral 135, is housed within portions of the first, second and third disc members 41-43. An inlet opening 137 is formed in the first disc member 41. A pressure compensated flow control 138, of the same type as the flow controls 88, 98, is provided adjacent the inlet opening for admitting a controlled flow of soft water to the aspirator 135 from the soft water collecting chamber 79.

A pair of bushings 151, 152 located downstream from the opening 138 define spaced convergent and divergent nozzles 153, 154, respectively. O-rings 155, 156 carried by the bushings 151, 152 prevent fluid flow along the outer walls of the bushings 151, 152. Fluid flowing through the divergent nozzle 154 is discharged into a passage 159.

A space 142 is defined between the convergent nozzle 153 and the divergent nozzle 154. The space 142 communicates with the brine conduit 15. When soft water flows at relatively high velocity through the aspirator nozzles 153, 154, an aspiration effect is created which draws brine through the conduit 15 and into the space 142 where it combines with the soft water flow and discharges through the divergent nozzle 154. When the aspiration flow through the divergent nozzle 154 is stopped, soft water entering the space 142 through the convergent nozzle 153 is supplied to the brine tank 11 through the brine conduit 15.

Two check valves 143, 144 are provided for selectively communicating the passage 159 with the return chambers 67, 68. The passage 159 has a pair of spaced downwardly extending branches terminated by openings 161, 162. Two resilient tubular members 161A, 162A are carried by the fourth disc member 44 and depend to surround the openings 161, 162. Two floating balls 163, 164 are movably carried near the openings 161, 162. When the balls 163, 164 are seated across the members 161A, 162A the check valves 143, 144 are closed. A pair of recesses 165, 166 are formed in the base member 39 opposite the openings 161, 162 to support the balls 163, 164 when they move away from the openings 161, 162 to open the check valves 143, 144.

A water usage turbine 170 is rotatably mounted in the outlet chamber 64. A nozzle 171 ducts soft water from the collecting chamber 79 to the outlet chamber 64. The turbine 170 is rotated by the flow of water discharged from the nozzle 171. The number of revolutions turned by the turbine 170 is a function of the quantity of softened water discharged from the water softener 10.

A first reducing gear train indicated generally by the numeral 171 is driven by the water usage turbine 170. A toothed drive pinion 172 is formed integrally with the turbine 170 and drives a first reduction gear 173 of the gear train 171. A final reduction gear 174 is driven at about 1/40,000 the speed of the turbine 170.

A second reducing gear train indicated generally by the numeral 181 is driven by the regeneration drive turbine 100. A toothed drive pinion 182 is formed integrally with the turbine 100 and drives a first reduction gear 183 of the gear train 181. A final reduction gear 184 is driven at 1/13,000 the speed of the turbine 100.

The final reduction gears 174, 184 are carried on shafts 175, 185 which project through the top wall of the top member 40 and into an upwardly opening recess 190 defined by the top member 40. Drive pinions 176, 186 positioned within the recess 190 are secured to the shafts 175, 185 for rotation with the final reduction gears 174, 184.

A pair of wheels 201, 202 are positioned in the recess 190 and are rotatably driven by the drive pinions 176, 186 at about two-fifteenths the speed of the pinions 176, 186. A stub shaft 211 carried by the top member 40 defines the axis of rotation of the wheels 201, 202. The upper wheel 201 is supported from beneath by the lower wheel 202. A central opening 212 is formed in the upper wheel 201 journals the rim 211 to rotatably mount the upper wheel 201 on the lower wheel 202.

The cover assembly 46 overlies portions of the top member 40 and closes the recess 190. The cover assembly 46 includes an annular member 221 which centrally carries a round transparent window 222. The juncture 223 between the annular member 221 and the window 222 is secured with adhesive to provide a leak-proof connection. An O-ring 224 seals the juncture between the cover assembly 46 and the top member 40.

A balance piston 225 is carried on the upper end region of the stub shaft 210. The piston 225 has a closed-ended aperture 225A which receives the upper end region of the stub shaft 210. The piston 225 has a tapered upper end region which is engageable with the underside of the window 222. When the upper end region of the piston 225 engages the underside of the window 222, there is a space 210A between the upper end of the shaft 210 and the end of the aperture 225A. An annular downwardly opening groove 226 is formed in the piston 225. An O-ring 227 seals the space between the periphery of the piston 225 and the rim all of the lower wheel 202.

A compression coil spring 227 has its upper end region positioned in the groove 226. The lower end of the spring 227 engages the lower wheel 202. The biasing action of the spring 227 biases the piston 225 toward the window 222, and biases the lower wheel 202 into engagement with the control disc 205.

The balance piston 225 serves to maintain a substantially constant force acting on the lower wheel 202 to bias the lower wheel 202 into engagement with the control disc 205. The water supply pressure with which the control valve of the present invention must be capable of operating typically falls somewhere within the range of 15 to 150 psi. The forces exerted on the lower wheel 202 are dependent, in part, on water pressure. The balance piston 225 compensates for water pressure forces in the following manner.

Figure 4:
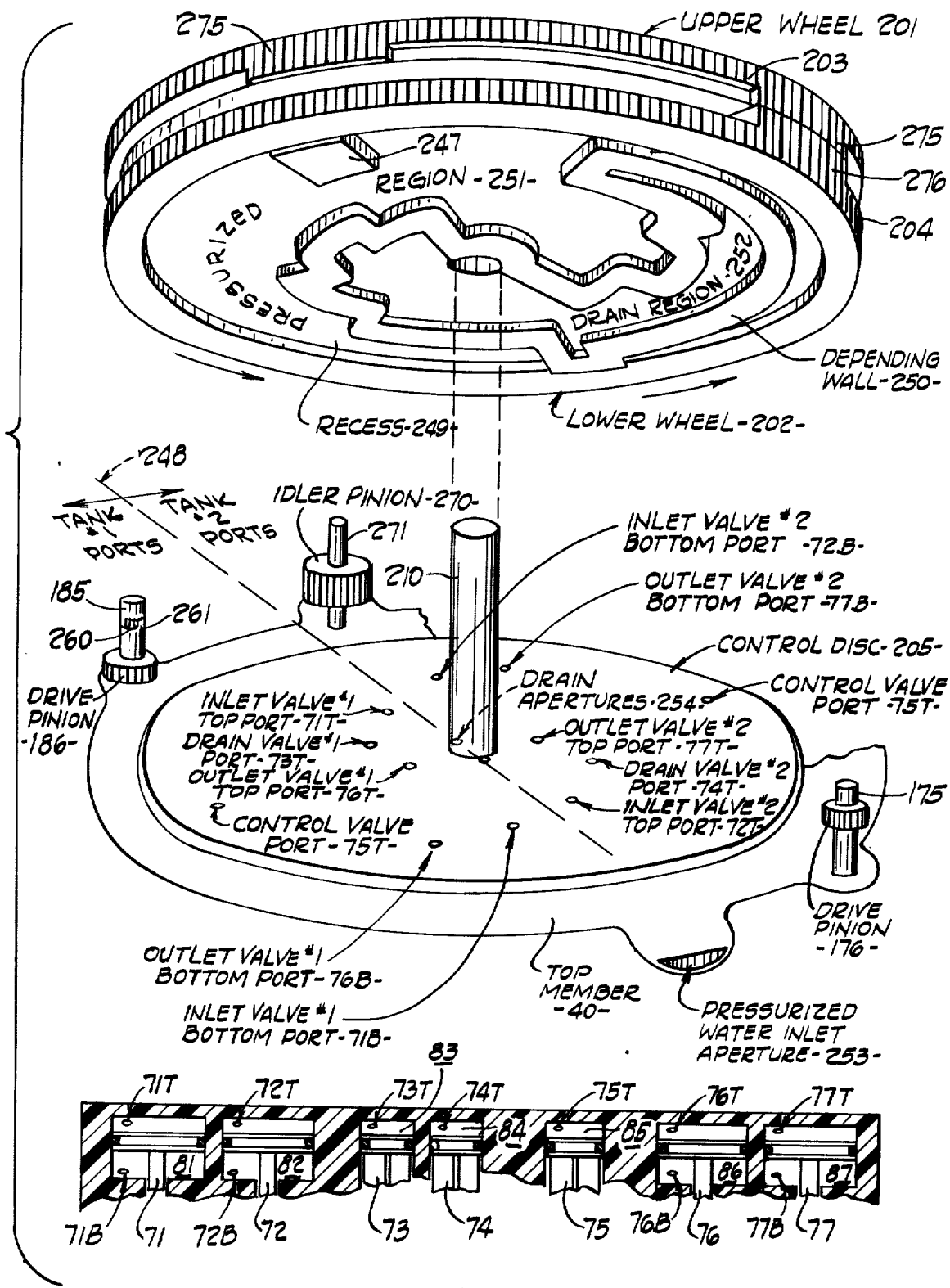
FIG. 4 is a schematic view depicting selected parts of the valve of FIG. 3 which form the pilot control system.
Figure 5:
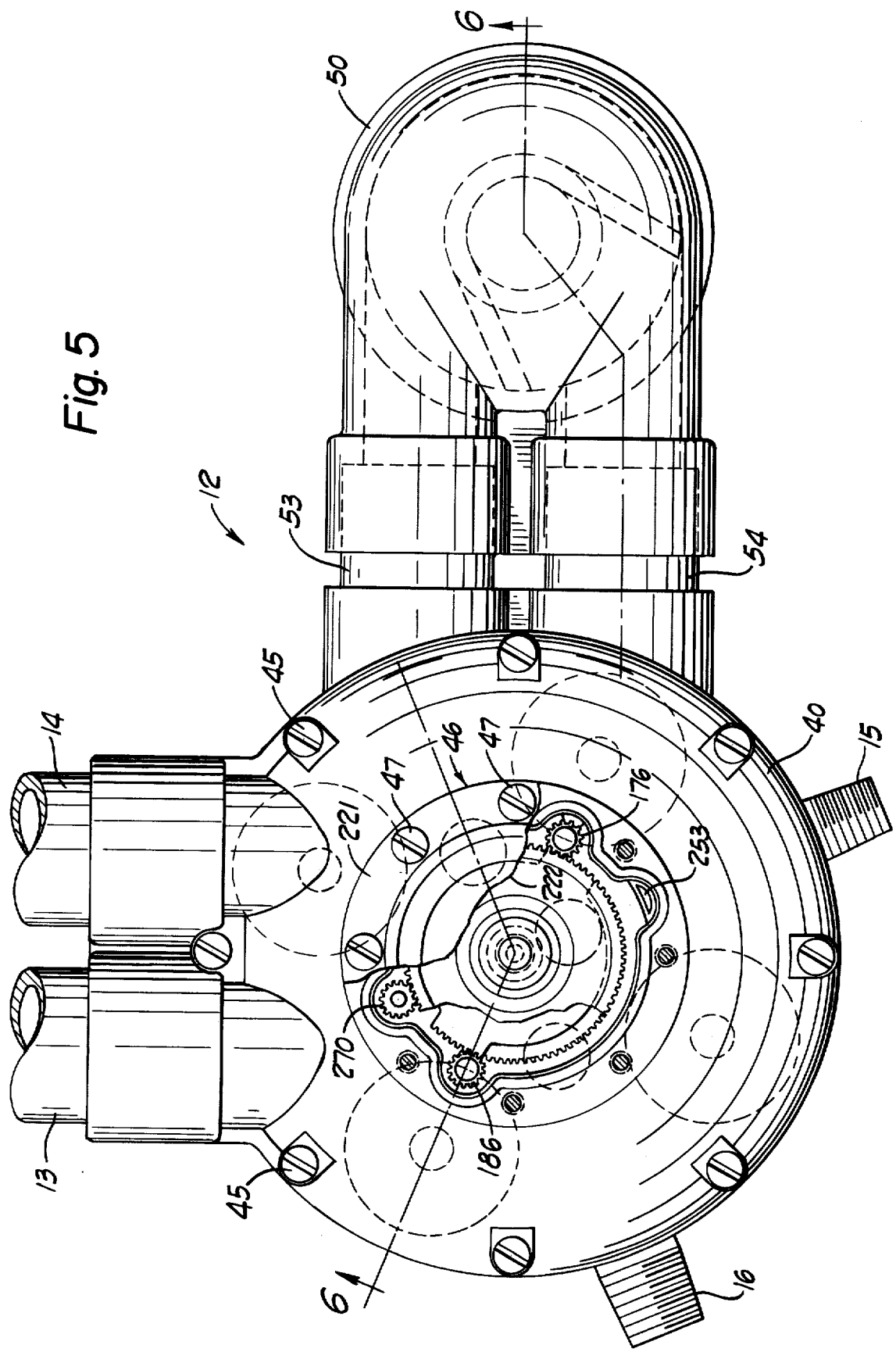
FIG. 5 is a top plan view on an enlarged scale of the control valve shown in FIGS. 1 and 2, with portions of the valve housing being broken away.

To begin with, as will be explained in greater detail, the underside of the lower wheel 202 is divided into two regions 251, 252 (FIG. 4). The region 251 is supplied with pressurized softened water and the pressure within this region creates a force which acts upwardly on the lower wheel 202. The region 252 is communicated with an ambient pressure drain.

Pressurized softened water is also supplied to the region atop the upper wheel 201 and atop the balance piston 225. In operation, the pressure of the softened water is sufficient to move the balance piston 225 out of engagement with the window 222 to a position where the closed end of the aperture 225A engages the upper end of the shaft 210. The region beneath the balance piston 225 is sealed by the O-ring 227 and is not subjected to water pressure. The area of the lower wheel 202 which is exposed to this non-pressurized region is approximately equal to the area of the drain region 252 on the underside of the lower wheel 202.

The pressurized softened water supplied to the region above the upper wheel 201 exerts a downward force on the upper wheel 201. This downward force is transmitted to the lower wheel 202. The area of the upper wheel 201 subjected to this downward force is approximately equal to the area of the pressurized region 251 which, as has been described, is subjected to an upward force. In short, the upward and downward forces on the lower wheel 202 resulting from water pressure are balanced. The principal biasing force which maintains engagement between the lower wheel 202 and the control disc 205 is supplied by the spring 226, and this force is substantially constant.

The control disc 205 and the lower wheel 202 form part of a servo-control system which effects opening and closing of the seven servo-valves 71–77. The major elements of the servo-control system are shown schematically in FIG. 4.

Referring to the lower portion of FIG. 4, the upper end regions of the seven servo-valves 71–77 are shown in their respective control chambers 81–87. Each of the chambers 81–87 has a control port which opens into the chamber above the upper ends of the servo-valves 71–77. These control ports are indicated by numerals which correspond with their associated servo-valves and by the letter T indicating a "topside" port, i.e., 71T, 72T, 73T, 74T, 75T, 76T, 77T. The inlet and outlet servo-valves 71, 72, 76, 77 also have "bottomside" ports which open into the chambers 81, 82, 86, 87 at locations below the piston-like upper end regions 71A, 72A, 76A, 77A of the vlaves 71, 72, 76, 77. These bottomside ports are indicated by the designations 71B, 72B, 76B, 77B.

Referring to the central portion of FIG. 4, a plurality of ports open through the top surface of the control disc 205. These ports correspond to and communicate with the topside and bottomside ports in the servo-valve control chambers 81–87, and are accordingly given the same designations, namely 71T, 72T, 73T, 74T, 75T, 76T, 77T, 71B, 76B, 77B. The passages which establish communication between the ports in the control disc 205 and the ports in the control chambers 81–87 are not shown in FIG. 4.

Several observations are in order concerning the arrangement of the ports in the control disc 205. To begin with, the ports which are associated with the tank 1 valves, namely the first inlet valve 71, the first drain valve 73, and the first outlet valve 76, are located on one side of the control disc 205. The ports associated with the tank 2 valves, namely the second inlet valve 72, the second drain valve 74, and the second outlet valve 77, are located on the other side of the control disc 205. An imaginary line indicated by the numeral 248 in FIG. 4 illustrates this division of the control disc 205.

There are two ports 75T in the control disc 205 which communicate with the control valve chamber 85. One of these ports is located in the tank-1-side of the control disc 205, and the other is located in the tank-2-side of the control disc 205.

Two further observations regarding the arrangement of ports in the control disc can be made. First, all of the ports on the tank-1-side of the control disc are located at different radial distances from the axis of the stub shaft 210. Second, the ports on the tank-2-side of the control disc are arranged symetrically with regard to the tank-1-side ports. The outlet valve top ports 76T, 77T are located nearest the stub shaft 210, with the other ports at increasing radial distances in the following sequence: drain valve ports 73T, 74T; inlet valve top ports 71T, 72T; inlet valve bottom ports 71B, 72B; outlet valve bottom ports 76B, 77B; and finally the control valve ports 75T.

Referring to the upper portion of FIG. 4, a downwardly opening cylindrical recess 249 is formed in the underside of the lower wheel 202. An endless depending wall 250 divides the recess 249 into two regions. The region outside the wall 250 will be called the pressurized region 251. The region confined within the wall 250 will be called the drain region 252.

A depending projection 247 is provided in the pressurized region 251. The bottom surface of the projection 247 is flat and extends in a common plane with the bottom surface of the wall 250. When the lower wheel 202 is biased into engagement with the control disc 205, as by the action of the spring 228, the bottom surfaces of the projection 247 and the wall 250 mate with the upper surface of the control disc 205 establishing fluid tight seals therebetween.

The sealing engagement between the bottom surface of the wall 250 and the upper surface of the disc 205 segregates the drain region 252 from the pressurized region 251 enabling a pressure differential to be maintained between the regions 251, 252. As the lower wheel 202 rotates relative to the control disc 205, the wall 250 passes over the several ports in the control disc to alternatively communicate these ports with the pressurized region 251 and the drain region 252.

Pressurized softened water is supplied to the pressurized region 251 from an inlet aperture 253 formed in the top member 40. The inlet aperture 253 communicates with the soft water collecting chamber 79. From the inlet aperture 253, pressurized soft water flows across portions of the top member 40 toward the control disc 205, and across such portions of the control disc 205 as are not confined within the depending wall 250.

Drain apertures 254 are provided in the control disc 205 on opposite sides of the stub shaft 210 for communicating the drain region 252 with the drain chamber 89. Ambient pressure prevails within the drain region 252.

The depending wall 250 has a shape which is configured to effect a sequenced communication of the ports formed in the control disc 205 with the pressurized and drain regions 251, 252. When the top port 71T of the first inlet valve 71 is communicated with the pressurized region 251 and the bottom port 71B is simultaneously communicated with the drain region 252, a pressure differential will be created across the piston-like upper end region of the valve 71 causing it to move downwardly into seating engagement with the tapered opening 121. When the bottom port 71B is communicated with the pressurized region 251 and the top port 71T is communicated with the drain region 252, an oppositely acting pressure differential causes the valve 71 to open. The second inlet valve 72, and the outlet valves 76, 77 operate in the same manner when their top and bottom ports are communicated with the pressurized region 251 and the drain region 252.

The drain valves 73, 74 and the control valve 75 are normally held closed by the fluid pressures within the chambers 65, 66 and 79, respectively. These valves are opened by communicating the ports 73T, 74T, 75T with the pressurized region 251. Since the piston-like upper ends of the valves 73, 74, 75 will open. Closure of the valves 73, 74, 75 is effected by communicating the ports 73T, 74T, 75T with the drain region 252 to relieve the pressure applied to the upper ends of these valves.

The specific sequence of port openings and closings effected by the interaction of the wall 250 and the control disc 205 will be described later. For purposes of the present explanation, only two observations need be made about the interaction between the lower wheel 202 and the control disc 205. First, regeneration cycles are begun with the projection 247 overlying and sealing one of the two control valve ports 75T formed in the control disc 205. Second, a regeneration cycle is completed when the lower wheel 202 has rotated 180 degrees to bring the projection 247 into overlying sealing relationship with the other of the control valve ports 75T formed in the disc 205.

When the projection 247 is sealing one of the control valve ports 75T, the other control valve port 75T is communicated with the drain region 252 causing the control valve 75 to assume its closed position. When the control valve 75 is closed no fluid flows through the nozzle 99 to drive the regeneration turbine 100. The result is that the drive pinion 186 is not driven by the shaft 185 when the projection 247 overlies one of the control valve ports 75T formed in the disc 205.

A lost-motion connection is provided between the drive pinion 186 and the shaft 185. As is best seen in the central portion of FIG. 4, the upper end region of the shaft 185 has an integrally formed depending drive shoulder 260. An upstanding projection 261 is formed on the drive pinion 186. When the shaft 185 is driven by the regeneration turbine 100, the shoulder 260 engages the projection 261 to establish a driving connection between the shaft 185 and the pinion 186. When the shaft 185 is at rest, the pinion 186 can rotate relative to the shaft 185 for part of a revolution.

The lost motion connection between the shaft 185 and the pinion 186 is needed to permit the lower wheel 202 to rotate by an amount sufficient to move the projection 247 out of engagement with one of the control valve ports 75T. As has been pointed out, the shaft 185 is at rest when the projection 247 overlies one of the control valve ports 75T. In order for a regeneration cycle to be initiated, the lower wheel 202 must be rotated by an amount sufficient to communicate the covered control port 75T with the pressurized region 251. Once this happens, the control valve 75 opens and a flow of fluid impinges on the regeneration turbine 100 causing the shaft 185 to rotate and causing the pinion 186 to drive the lower wheel 202 through a regeneration cycle.

The regeneration cycle terminates when the lower wheel 202 rotates to a position where the projection 247 again closes one of the control valve ports 75T. When this happens, the control valve 75 closes, the turbine 100 is no longer driven, and the shaft 185 ceases to rotate.

The mechanism which effects the initial rotation of the lower wheel 202 to initiate a regeneration cycle includes the drive pinion 176, the upper wheel 201, and an idler pinion 270. The idler pinion 270 is supported on an integrally formed stub shaft 271. Opposite ends of the stub shaft 271 are journaled for rotation in the top member 40 and the cover member 221.

The idler pinion 270 has a toothed perimetrical surface which is supported at a height intermediate the heights of the toothed surfaces of the drive pinions 176, 186. The intermediate-height relationship of the toothed idler pinion 270 prevents the idler pinion 270 from engaging either of the continuous toothed perimetrical tracks 203, 204 of the wheels 201, 202.

A discontinuous toothed track of four equally spaced segments 275 (only two are shown in FIG. 4) is formed on the upper wheel 201 below the continuous toothed track 203. A discontinuous toothed track of two equally spaced segments 276 (only one is shown in FIG. 4) is formed on the lower wheel 202 above the continuous toothed track 204. The toothed segments 275, 276 are positioned to establish mating engagement with the idler pinion 270.

The two equally spaced segments 276 on the lower wheel 202 are located such that one of the segments 276 will be in meshing engagement with the idler pinion 270 when the projection 247 closes one of the control valve ports 75T. Assuming the lower wheel 202 is so positioned, it will be seen that the initial rotation of the lower wheel which is needed to initiate a regeneration cycle is effected when the upper wheel 201 rotates to a position where one of the segments 275 is brought into meshing engagement with the idler pinion 270. Engagement between one of the segments 275 and the idler pinion 270 at a time when one of the segments 276 is also in engagement with the idler pinion 270 will cause the lower wheel 202 to be driven with the upper wheel 201. This concurrent driving of the wheels 201, 202 will continue until the pinion 270 is no longer in concurrent engagement with the segments 275, 276. The segments 275, 276 have toothed tracks which are of sufficient length to drive the lower wheel 202 to a position where the projection 247 uncovers one of the control valve ports 75T. After this occurs, the drive pinion 186 takes over the driving of the lower wheel 202 to effect a regeneration cycle.

The relationship between the amount of softened water which is used and the frequency of regeneration cycle initiation can be changed by increasing or decreasing the number of equally spaced toothed segments 275 provided on the upper wheel 201. Decreasing the number of segments 275 will permit more soft water to be used before a regeneration cycle is initiated. Increasing the number of segments 275 will cause a regeneration cycle to be initiated after a lesser amount of soft water has been used. An upper wheel 201 with the proper number of toothed segments 275 is selected at the time the water softener is installed to correspond with the hardness of the water in the locality of the softener. Once this selection has been made and the proper upper wheel 201 has been installed, there are no further adjustments to be made to effect the proper number of regenerations in accordance with water hardness and soft water usage.

The upper wheel 201 is preferably provided with suitable indicia which can be viewed through the window 222 to indicate which one of a series of upper wheels 201 is installed in the softener 10. The upper wheel 201 is also preferably calibrated to indicate what phase of operation the softener 10 is in at any particular time.

Before describing the operation of the valve 12, reference will be made of FIGS. 5-9 which show the actual three-dimensional arrangement of the several components described in connection with FIGS. 3 and 4. The same reference numerals are used in FIGS. 5-9 to refer to the components in FIGS. 3 and 4.

Figure 6:
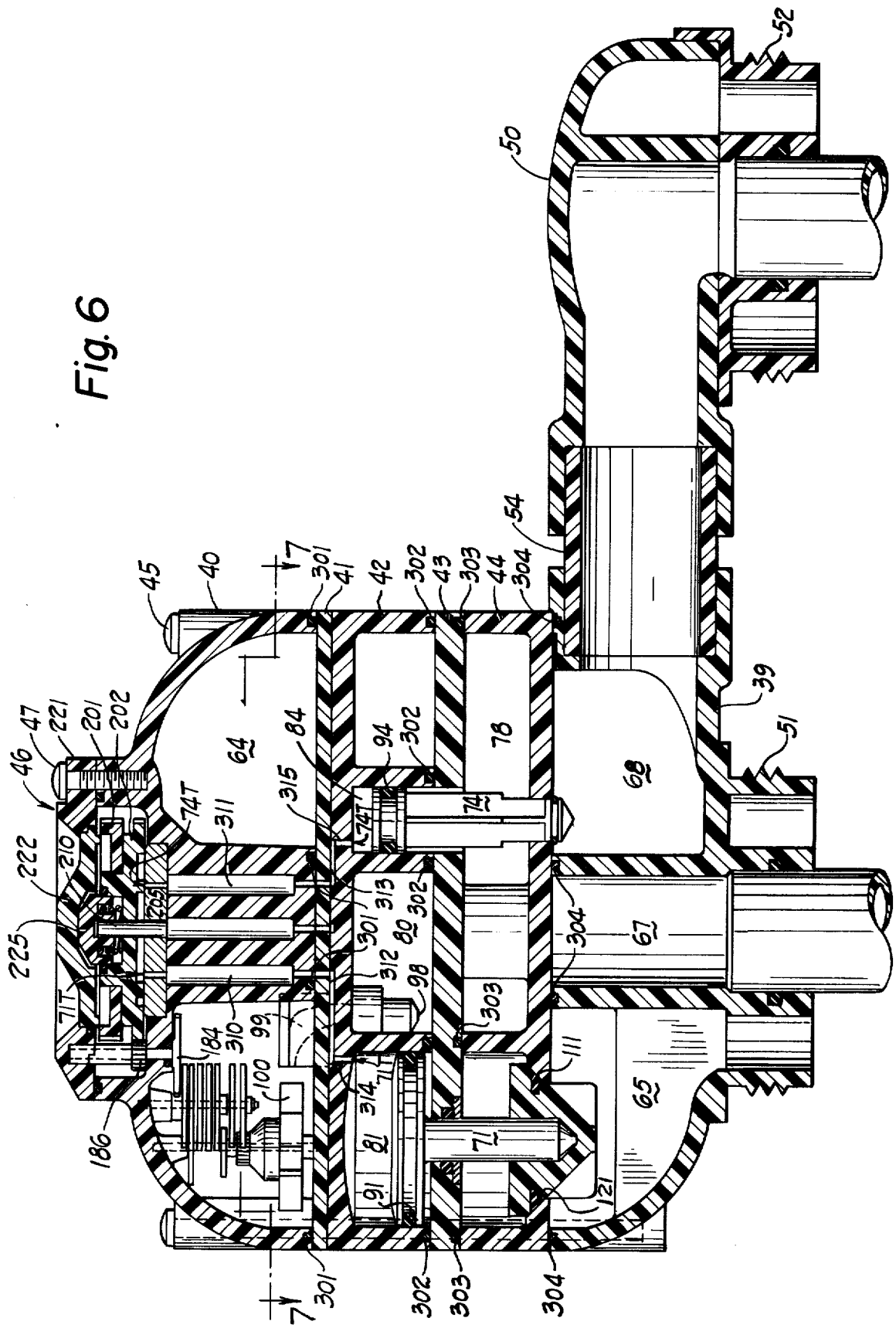
FIG. 6 is a cross-sectional view as seen from the several planes indicated by the broken line 6—6 in FIG. 5.

Referring particularly to FIG. 6, several details of construction are shown which were not brought out in FIGS. 3 and 4. A series of resilient seals 301, 302, 303, 304 are provided between adjacent housing members 39-44. The seals 301-304 are of relatively complex configuration as required to prevent fluid communication between the various chambers defined within the members 39-44.

Two of the passages which communicate the ports formed in the control disc 205 with the several ports in the valve chambers 81-87 are shown in FIG. 6. Passages 310, 311 extend vertically from the ports 71T, 74T, in the control disc 205 through the top member 40 and through the first disc member 41. The passages 310, 311 have horizontal reaches 312, 313 and continued vertical reaches 314, 315 formed in the second disc member 42 which complete the connection with the ports 71T, 74T in the valve chambers 81, 84.

Similar passages are provided to communicate the other ports in the control disc 205 with the other ports in the valve chambers 81-87, but they will not be described in detail. A number of these passages appear in dotted lines in FIG. 7.

FIGS. 8 and 9, present enlarged cross-sectional views of the aspirator 135 illustrating its location along the outer walls of the housing members 41-44.

The operation of the valve assembly 12 will now be described in connection with a chart presented as FIG. 10 of the drawings. In FIG. 10, an X in one of the columns corresponding to the valves 71-77 indicates that this valve closes or is closed at the time of the function appearing to the left of the X. An O indicates that the valve opens or is open at the time of the function appearing to the left of the O. A line under either an X or an O indicates that this condition has just changed.

The operational description will begin with tank 1 on-line receiving hard water from the inlet conduit 13 and supplying soft water to the outlet conduit 14, and with tank 2 being fully regenerated and held off-line ready for service. When the water usage turbine 170 has rotated through a predetermined number of revolutions corresponding to the exhaustion of tank 1, the upper wheel 201 will be rotated to a position where one of the segments 275 engages the idler pinion 270 to effect concurrent rotation of the lower wheel 202. The initial rotation imparted to the lower wheel 202 by the idler pinion 270 is sufficient to displace the projection 247 from its normal in-service position atop one of the control valve ports 75T. When this is done, the control valve 75 opens (step 2, FIG. 10) establishing a controlled flow of softened water from the collecting chamber 79 through the nozzle 99 to the regeneration turbine 100. Rotation of the regeneration turbine 100 causes the drive pinion 186 to rotate effecting continued rotation of the lower wheel 202.

As the lower wheel 202 continues through a 180 degree rotation, the second inlet valve 72 is opened (step 3) to put tank 2 into parallel service with tank 1. The first inlet valve 71 is then closed (step 4) to take tank 1 out of service. The first outlet valve 76 is subsequently closed (step 5) to cut off the back pressure of softened water to tank 1. Back pressure continues to be applied through the aspirator 135.

When the first drain valve 73 is open (step 6), the regeneration backwash flow of tank 1 is begun. Soft water flows from the collecting chamber 79 through the aspirator 135. The flow control 138 precisely controls the rate of this flow to prevent excessive expansion of "floating" of the resin bed in tank 1 which could cause loss of regeneration efficiency. Brine solution is drawn through the brine conduit 15 and mixed with the soft water in the aspirator 135. The mixture of soft water and brine then flows through the check valve 143 and enters tank 1 through the riser pipe 23 for backflow through the softening chemical 27. Backwash fluid discharged from tank 1 re-enters the valve assembly 12 and passes through the first drain valve 73 to the drain conduit 16. When the supply of brine within the brine tank 11 is exhausted, the slow backwash continues with soft water from the collecting chamber 79.

After a period of slow backwash, a fast backwash rinse is begun by opening the first outlet valve 76 (step 7). When the first outlet valve 76 opens, soft water from the collecting chamber 79 is supplied at a faster but controlled rate of flow to the riser tube 23 of tank 1 and a thorough backwash rinse follows. The regeneration of tank 1 is completed when the first drain valve 73 is closed (step 8) to terminate the backwash.

The lower wheel 202 continues to rotate briefly until the projection 257 is brought into registry with one of the control valve ports 75T. As has been explained, this causes the control valve 75 to close (step 9), cutting off the flow of soft water to the regeneration drive turbine 100. The regeneration tank 1 is then held off-line ready for service (step 1A).

Regeneration of tank 2 is completed in the same manner as described in conjunction with tank 1. The chart of FIG. 10 shows the sequence of steps involved in the regeneration of tank 2, the steps being labeled 2A-9A in correspondence with steps 2-9.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:

1. A control device for use in a water conditioning apparatus of the type including a pair of ion-exchange water softener tanks connectable with a source of pressurized water and with a water system to supply softened water to the water system, the tanks each being capable of regeneration by flushing with a regeneration solution to replenish depleted ions, comprising:

a. a housing adapted for connection to the softener tanks, to the source of pressurized water, to the water system, and to a source of regeneration solution;
   b. water usage monitoring means carried by said housing for monitoring the flow of softened water supplied to the water system and including an output which moves in response to the supply of softened water to the water system;
   c. control means carried by said housing for movement along a predetermined path from a first position to a second position, said control means being responsive to the movement of said monitoring means output through a first movement to effect an initial movement from said first position toward said second position;
   d. a control valve carried within said housing and being responsive to said initial movement to provide a controlled flow of softened water to a passage formed with said housing;
   e. regeneration drive means carried within said housing and having an output which moves in response to the flow of softened water through said passage, said drive means output being connected to said control means to continue the driven movement of said control means along said path from said first position to said second position; and
   f. valve means carried by said housing and being responsive to said continued movement to connect a first one of the softener tanks on-line with the source of pressurized water and the water system, and to take the second softener tank off-line and effect its regeneration by flushing said second softener tank with regeneration solution.

2. The control device of claim 1 wherein:

a. said control means is movable along a second predetermined path from said second position to said first position, and said control means is responsive to the movement of said monitoring means output through a second movement to effect an initial movement from said second position toward said first position;
   b. said control valve is additionally responsive to said initial movement of said control means from said second position to provide a controlled flow of softened water to said passage and said regeneration drive means is responsive thereto to continue the driven movement of said control means along said second path from said second position to said first position; and
   c. said valve means is responsive to said continued movement along said second path to connect said second softener tank on-line and to take said first softener tank off-line and effect its regeneration by flushing said first softener tank with regeneration solution.

3. The control device of claim 2 wherein said control means is operative to close said control valve when said control means arrives at said first position and at said second position, whereby the controlled flow of softened water which drives said regeneration drive means is cut off and said regeneration drive means ceases to drive said control member.

4. The control device of claim 3 wherein:

a. said valve means includes a plurality of control chambers defined within said housing and a plurality of servo-valves movably carried in said housing and having portions movably received within said control chambers; and, b. said control means forms part of a pilot system for communicating said control chambers selectively with pressurized softened water from the on-line tank and with an ambient pressure drain to establish pressure differentials which are operative to open and close said servo-valves in response to movement of said control means.

5. The control device of claim 4 wherein:

a. said control means has a face which is divided into two separate regions, one of said regions being supplied with pressurized softened water from the on-line tank, and the other region being communicated with an ambient pressure drain;

b. said pilot system additionally includes a control member having a plurality of ports which open toward said face of said control means and are communicated with said control chambers; and, c. said control means is operative during its movement to selectively communicate said ports with said regions to effect opening and closing of said servo-valves in a predetermined sequence.

6. The control device of claim 5 wherein:

a. said control means includes a control wheel rotatably carried by said housing adjacent said control member;

b. movement of said control means from said first position to said second position is accomplished by the rotation of said wheel in a predetermined direction of rotation from a first position through an arc of 180° to a second position; and c. movement of said control means from said second position to said first position is accomplished by the rotation of said wheel in said predetermined direction of rotation from said second position through an arc of 180° to said first position.

7. The control device of claim 6 wherein:

a. said monitoring means includes a water usage turbine rotatably positioned in the path of softened water supplied to the water system;

b. a first gear train is operative to intermittently drivingly connect said water usage turbine with said control wheel to effect said initial movements of said control wheel;

c. said drive means includes a regeneration turbine rotatably positioned in the path of softened water discharging from said passage; and, d. a second gear train is operative to drivingly connect said regeneration turbine with said control wheel to effect said continued movements of said control wheel.

8. The control device of claim 7 wherein a transparent window is provided in said housing and said first gear train includes a rotatably mounted indicator means visible through said window and drivingly connected to said water usage turbine for indicating the degree of exhaustion of the on-line tank.

9. The control device of claim 7 wherein said first gear train includes;

a. a rotatably mounted indicator wheel having a continuous toothed perimetrical track;

b. reducing gear train means drivingly connecting said track with said water usage turbine for rotating said indicator wheel through less than a complete revolution while said water usage turbine rotates through said predetermined number of revolutions; and c. intermittent drive means for intermittently drivingly connecting said indicator wheel and said control wheel to effect said initial movements of said control wheel.

10. The control device of claim 9 wherein:

a. said control wheel has a discontinuous toothed perimetrical track formed thereon including a pair of toothed segments disposed symmetrically on opposite sides of said control wheel;

b. said indicator wheel has a discontinuous toothed perimetrical track formed thereon including at least one toothed segment; and c. said intermittent drive means includes a rotatably mounted idler pinion means positioned to drivingly engage one of said pair of toothed segments when said control wheel is in said first position, positioned to drivingly engage the other of said pair of toothed segments when said control wheel is in said second position, and positioned to intermittently engage said at least one toothed segment as said indicator wheel rotates, whereby the driving engagement between said at lease one segment and said idler pinion means is operative to effect said initial movements of said control wheel at such times as one of said pair of segments is concurrently in driving engagement with said idler pinion means.

11. A control device for use in a water conditioning apparatus of the type including a pair of ion-exchange water softener tanks connectable with a source of pressurized water and with a water system to supply softened water to the water system, the tanks each being capable of regeneration by flushing with a regeneration solution to replenish depleted ions, comprising:

a. a housing adapted for connection to the softener tanks, to the source of pressurized water, to the water supply system, to a source of regeneration solution, and to a drain;

b. water usage monitoring means carried with said housing for monitoring the flow of softened water supplied to the water system and including an output which rotates in response to the supply of softened water to the water system;

c. a control wheel rotatably mounted in said housing for rotation in a predetermined direction through a first arc from a first position to a second position, and through a second arc from said second position to said first position;

d. first drive means drivingly connecting said control wheel and said monitoring means output for effecting an initial movement of said control wheel from said first position toward said second position after said monitoring means output has rotated through a first cycle of a predetermined number of revolutions, and for effecting an initial movement of said control wheel from said second position toward said first position after said monitoring means output has rotated through a second cycle of said predetermined number of revolutions;

e. a control valve carried within said housing and being responsive to said initial movements of said control wheel to provide a controlled flow of softened water to a passage formed within said housing;

f. regeneration drive means carried within said housing and having an output which rotates in response to the flow of softened water through said passage;

g. second drive means drivingly connecting said control wheel and said regeneration drive means output for continuing the driven movement of said control wheel along said first arc once said control has effected said initial movement from said first position, and for continuing the driven movement of said control wheel along said second arc once said control wheel has effected said initial movement from said second position; and h. tank valve means carried within said housing and (1) being responsive to said continued movement of said control wheel along said first arc to connect one of said softener tanks on-line with the water system and to take the other softener tank off-line and effect its regeneration, and (2) being responsive to said continued movement of said control wheel along said second arc to connect said other softener tank on-line with the water system and to take said one softener tank off-line and effect its regeneration.

12. The control device of claim 11 wherein:
a. said control valve and said tank valve means include a plurality of servo-valves movably carried within said housing; and
b. said control wheel serves as part of a pilot system for controlling the opening and closing of said servo-valves.

13. The control device of claim 12 wherein:
a. said housing includes:
  i. a base member adapted for connection to the softener tanks;
  ii. a top member adapted for connection to the source of pressurized water and to the water system; and
  iii. a stacked array of intermediate members interposed between said base member and said top member;
b. said monitoring means, said regeneration drive means, said first drive means, said second drive means, and said control wheel are carried within said top member; and
c. said servo-valves are carried within said stacked array of intermediate members.

14. The control device of claim 13 wherein:
a. at least two of said intermediate members cooperate to define a plurality of separate control chambers;
b. each of said servo-valves has a portion which is movably carried within a separate one of said control chambers;
c. each of said servo-valves has another portion which is movable into and out of seating engagement with openings defined in said housing to control fluid flow through said openings;
d. said control wheel has a face which is divided into two regions, one of said regions being supplied with pressurized softened water from the on-line tank, and the other of said regions being communicated with an ambient pressure drain; and
e. a control member is positioned adjacent said face presenting a plurality of ports opening toward said face, said ports being communicated with selective ones of said control chambers and being positioned relative to said face for sequential communication with said regions as said control wheel rotates relative to said control member.

15. The control device of claim 11 wherein said first drive means includes:
a. a rotatably mounted indicator wheel having a continuous toothed perimetrical track;
b. reducing gear train means drivingly connecting said track with said monitoring means output for rotating said indicator wheel through less than a complete revolution while said monitoring means output rotates through said predetermined number of revolutions; and
c. intermittent drive means for intermittently drivingly connecting said indicator wheel and said control wheel to effect said initial movements of said control wheel.

16. The control device of claim 15 wherein:
a. said control wheel has a discontinuous toothed perimetrical track formed thereon including a pair of toothed segments disposed symmetrically on opposite sides of said control wheel;
b. said indicator wheel has a discontinuous toothed perimetrical track formed thereon including at least one toothed segment; and
c. said intermittent drive means icludes a rotatably mounted idler pinion means positioned to drivingly engage one of said pair of toothed segments when said control wheel is in said first position, positioned to drivingly engage the other of said pair of toothed segments when said control wheel is in said second position, and positioned to intermittently engage said at least one toothed segment as said indicator wheel rotates, whereby the driving engagement between said at least one segment and said idler pinion means is operative to effect said initial movements of said control wheel at such times as one of said pair of segments is concurrently in driving engagement with said idler pinion means.

17. The control device of claim 11 wherein a transparent window is provided in said housing and said first gear train includes a rotatably mounted indicator means visible through said window and drivingly connected to said water usage turbine for indicating the degree of exhaustion of the on-line tank.

18. The control device of claim 11 wherein:
a. said monitoring means includes a water usage turbine rotatably positioned in the path of softened water supplied to the water system; and,
b. said regeneration drive means includes a first gear train is operative to intermittently drivingly connect said water usage turbine with said control wheel to effect said initial movements of said control wheel.

19. In a water conditioning apparatus of the type including a pair of ion-exchange water softener tanks which are connectable with a source of pressurized water and with a water system to supply softened water to the water system, the improvement of a control device for alternately connecting the softener tanks on-line with the water supply system, comprising:
a. a housing;
b. water usage monitoring means carried in said housing for monitoring the flow of softened water supplied to the water system and having an output which rotates in response to the supply of softened water to the water system;
c. an indicator wheel drivingly connected to said monitoring means output for rotation in response to rotation of said output, said indicator wheel being operable to rotate through a fraction of one revolution in response to rotation of said output through a predetermined number of revolutions which correspond to a usage of softened water sufficient to substantially exhaust the ion-exchange capability of the on-line softener tank;

d. a transparent window carried by said housing at a position near said indicator wheel permitting selected portions of said indicator wheel to be viewed from outside said housing to provide a visual indication of the degree of exhaustion of the on-line tank; and, e. valve means carried in said housing and being responsive to the movement of said indicator wheel through said fraction of one revolution to take the exhausted softener tank off-line and connect the other softener tank on-line without interrupting the supply of softened water to the water system.

20. The apparatus of claim 19 wherein said softener tanks are capable of regeneration to replace depleted ions by flushing with a regeneration solution, and said valve means is additionally operative to effect a regeneration of said exhausted tank by connecting said exhausted tank for flushing with a source of regeneration solution.

21. The apparatus of claim 20 wherein:

a. a regeneration drive means having a rotatable output is carried in said housing;

b. said valve means is operable to supply a controlled flow of softened water to said drive means to rotate said drive means output once said indicator wheel has moved through said fraction of one revolution;

c. a programmed control means is drivingly connected to said drive means output and is operable in response to the rotation of said drive means output to cycle said valve means through a predetermined program whereby said exhausted tank is flushed with regeneration solution to restore depleted ions, flushed with softened water from the on-line tank, and is then held off-line ready for service until said indicator wheel has rotated through another said fraction of one revolution.

* * * * *

UNITED STATES PATENT AND TRADEMARK OFFICE
CERTIFICATE OF CORRECTION

PATENT NO. : 3,891,552
DATED : June 24, 1975
INVENTOR(S) : William C. Prior

It is certified that error appears in the above-identified patent and that said Letters Patent are hereby corrected as shown below:

Column 9, line 45, delete "all" and substitute - - 211 - -

Column 14, line 13, delete "of" and substitute - - to - -
Column 14, line 47, insert quotation marks before and after "X"
Column 14, line 50, insert quotation marks before and after "X" and "O"
Column 14, lines 52, insert quotation marks before and after "O" and "X"
Column 14, line 53, insert quotation marks before and after "O"
Column 19, line 6, Claim 11, before the word "has" insert - - wheel - -

Signed and Sealed this twenty-fifth Day of November 1975

[SEAL]

Attest:

RUTH C. MASON
Attesting Officer

C. MARSHALL DANN
Commissioner of Patents and Trademarks